Position of Priming Liquid in Relation to Impeller During Priming at Low Vacuums Position of Priming Liquid in Relation to Impeller During Priming at High Vacuums Inventors
John Mann
Romaine P. Shuster
By
their Attorney

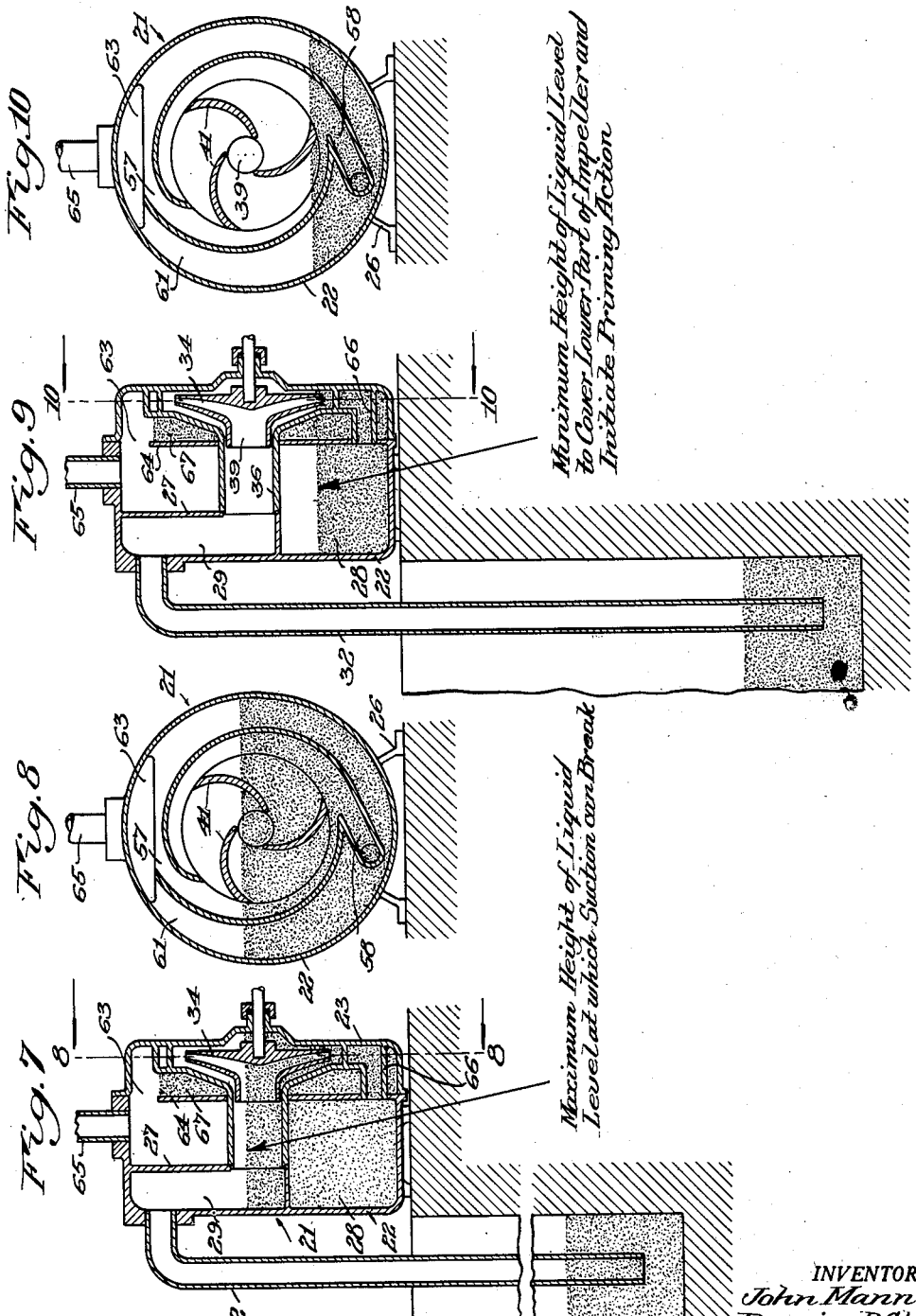

Feb. 10, 1953 J. MANN ET AL 2,627,817
SELF-PRIMING CENTRIFUGAL PUMPS
Filed July 8, 1949 5 Sheets-Sheet 3

Liquid Level must Positively Seal the Passage to the Intake Volute During Priming INVENTORS
John Mann
BY Romaine P. Shuster their Attorney

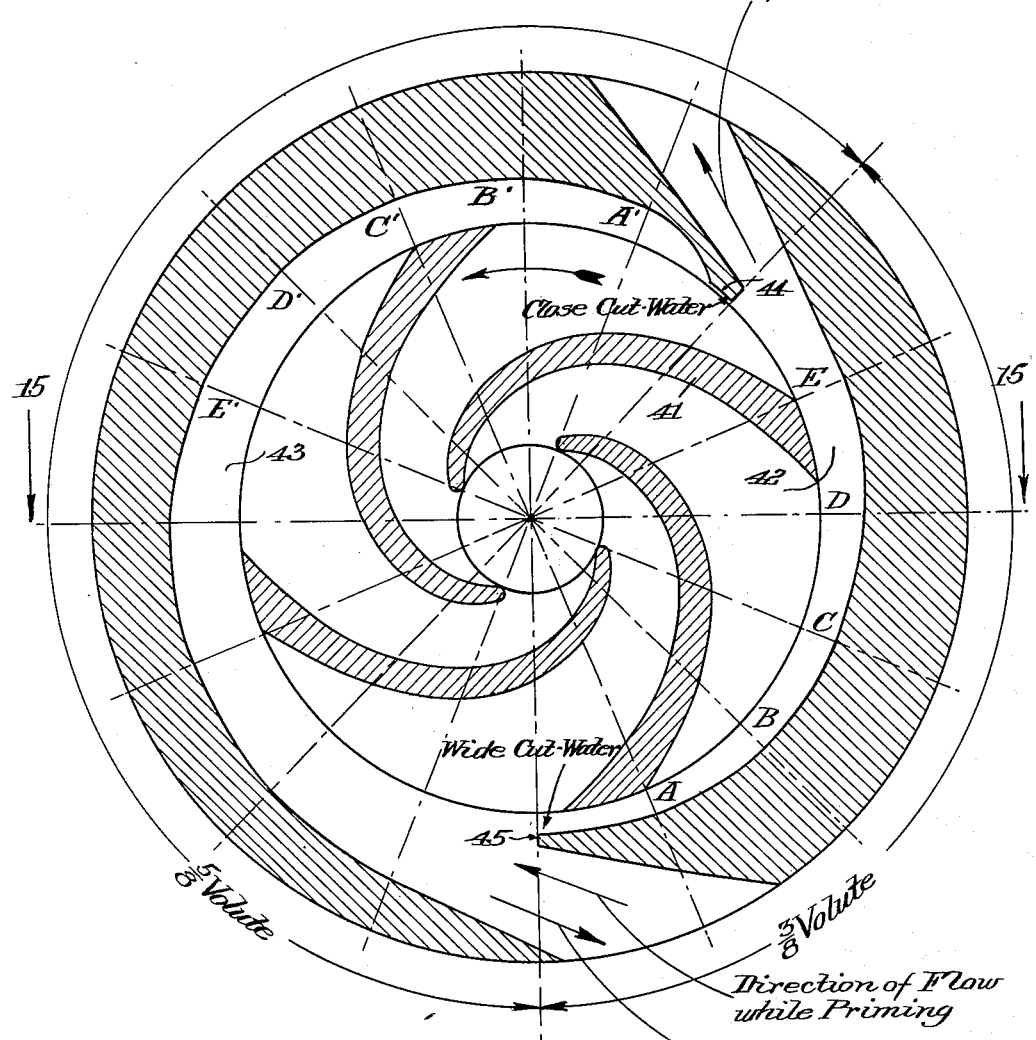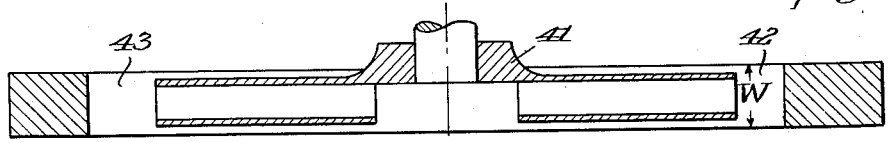

Patented Feb. 10, 1953

2,627,817

UNITED STATES PATENT OFFICE 2,627,817

SELF-PRIMING CENTRIFUGAL PUMP

John Mann and Romaine P. Shuster, Seneca Falls, N. Y., assignors to Goulds Pumps, Inc., Seneca Falls, N. Y., a corporation of New York Application July 8, 1949, Serial No. 103,644

22 Claims. (Cl. 103—113)

Our invention relates to self-priming centrifugal pumps. Reference is made to the co-pending application of John Mann, Serial No. 595,019 entitled "Pumps" filed May 21, 1945, which also discloses a self-priming centrifugal pump.

Among the advantages of a conventional centrifugal pump may be mentioned the facts that for a given capacity it is small in bulk, efficient in operation and comprises but relatively few moving parts subject to wear and likely to get out of order. However, a major disadvantage of a centrifugal pump is that it will not handle air in any large quantities. When air or gases are encountered, a centrifugal pump is likely to lose its prime and must be reprimed. Moreover, because of the inability of a conventional centrifugal pump to prime itself the pump must be equipped with a foot or check valve adapted to maintain the centrifugal pump casing and the suction line filled with water when the pump stops. In other cases auxiliary primers are used. When used to maintain priming liquid in a pump, foot or check valves are a source of trouble, particularly when the water contains sand or other foreign material likely to become lodged on the seating surfaces of the valve. This at times prevents the valve from closing tightly and retaining water in the suction pipe and the pump casing and results in the necessity of cleaning the valve and repriming the pump with liquid.

Various methods and constructions have been developed for enabling centrifugal pumps to prime a suction line. However, most self-priming pumps with which we are familiar sacrifice pumping efficiency to secure self-priming.

In the self-priming pump of the above mentioned application, two discharge channels or preferably volutes are employed. The volutes may be of equal length or one may be longer than the other. Each of the volutes has what is termed in the art a "cutwater" or "cutoff." These cutwaters are unequally spaced with respect to the periphery of the impeller. The close cutwater may clear the impeller periphery by approximately 1/64 of an inch or less while the wide cutwater has a substantially greater clearance with respect to the periphery of the impeller depending to some extent upon the size of the pump and the design of the volutes. The impeller and the discharges from the two volutes are submerged by the priming liquid which is contained in an air separation chamber.

The purpose of the close and wide cutwaters is to create an unbalance so that the liquid of the priming charge during the priming cycle will flow into one volute past the wide cutwater and a mixture of this liquid and air or gas evacuated from the suction line discharge out of the other volute past the close cutwater.

While the intention in the pump of the above mentioned application is to carry out the above described operation, the action is not positively in one direction. Occasionally the flow of liquid will reverse and enter at the close cutwater and discharge past the wide cutwater. Two pumps differing only in production variables may act differently during priming.

The importance during the priming cycle of always having the water enter the impeller casing through one volute and discharge through the other is that unless this action is positive and certain, it is necessary to keep the impeller and both volute discharges submerged so that either volute may draw liquid from the air separation chamber and not become exposed to air. This results in a large, bulky pump with an air separating chamber extending well above the pump casing. Moreover, such a pump which requires an air separation chamber or water reservoir above the level of the impeller and the volute discharges, requires some means for retaining in the air separation chamber or reservoir, a volume of liquid sufficient to cover the impeller and both volute discharges when the pump is stopped. Such means may be a foot valve or check valve to maintain the entire system primed. A syphon breaker and knee bend may be used where it is desired to drain the suction line upon stopping the pump without syphoning the priming charge from the pump casing.

In the type of pump illustrated in the above mentioned application, should only one volute and the lower portion of the impeller in a horizontally mounted pump be submerged, then air would be drawn in through the exposed volute if the priming action reversed and the priming action would be halted.

An object of our invention is to provide a self-priming centrifugal pump which may either be of the open or closed impeller type which is constructed and arranged so that after the priming cycle is completed, the pump operates as a conventional centrifugal pump with consequent pump efficiencies which are comparable to the efficiencies of conventional non self-priming centrifugal pumps.

Another object of our invention is to provide a self-priming centrifugal pump which is highly efficient in operation, compact in construction and in which the necessity for a foot or check valve or any other obstruction in the suction or discharge lines of the pump in order to maintain the pump casing primed is avoided.

Another object of our invention is to provide a self-priming centrifugal pump wherein the discharge and suction lines may drain back to the source of supply when the pump is stopped and yet leave a priming charge of liquid in the pump without the use of valves of any kind or any kind of mechanically or electrically operated syphon breaker.

Another object of our invention is to provide a pump so constructed and arranged, particularly with respect to the location, shaping and proportions of the volutes that the pump will prime itself even with the water level at or somewhat below the centerline of the pump impeller and with the discharge volute of the pump exposed to atmosphere whereby to eliminate the necessity of maintaining positive liquid submergence of the discharge volute.

Still another object of our invention is to reduce the overall bulk and weight of a self-priming pump in which an air separation chamber is employed by interposing between the air separation chamber and the discharge from the pump casing, a velocity dissipation chamber to thereby reduce the velocity of the liquid prior to its flow into the air separation chamber to reduce turbulence in the air separation chamber and provide more efficient air separation.

Our invention further contemplates the provision of a self-priming centrifugal pump and a method of operating such a pump wherein two or more volute discharge passages are provided which are constructed, proportioned and shaped to the end that one of the volute passages during the priming cycle always acts as an intake for drawing water from which air has been largely removed, while the other volute always acts as the discharge for liquid and air from the pump casing to the end that the discharge volute in a horizontally mounted pump may be placed adjacent the top of the pump casing and does not require positive submergence by liquid to enable priming of the pump whereby the air separation chamber may be placed sidewardly with respect to the pump casing to thereby reduce the bulk, weight and cost of the unit, no valves of any kind need be employed and no mechanically or electrically operated syphon breaker is necessary.

Other objects and advantages of our invention will be set forth in the claims and will be apparent from the following description, when taken in connection with the accompanying drawings, in which:

Fig. 7 is a diagrammatic sectional view indicating the maximum height of the liquid level at which air from the discharge side may break the syphoning action and vent the system when the pump is stopped;

Fig. 8 is a sectional view taken substantially on line 8—8 of Fig. 7;

Fig. 9 is a diagrammatic sectional view showing the theoretical minimum height of the liquid level to cover the lower part of the pump impeller and enable priming action to be initiated;

Fig. 10 is a sectional view taken substantially on the line 10—10 of Fig. 9 in the direction indicated by the arrows;

Fig. 14 is a schematic view illustrating the principles upon which the self-priming pump of our invention is constructed; and Fig. 15 is a sectional view taken substantially on line 15—15 of Fig. 14 in the direction indicated by the arrows with the vanes of the impeller omitted.

Figure 1:
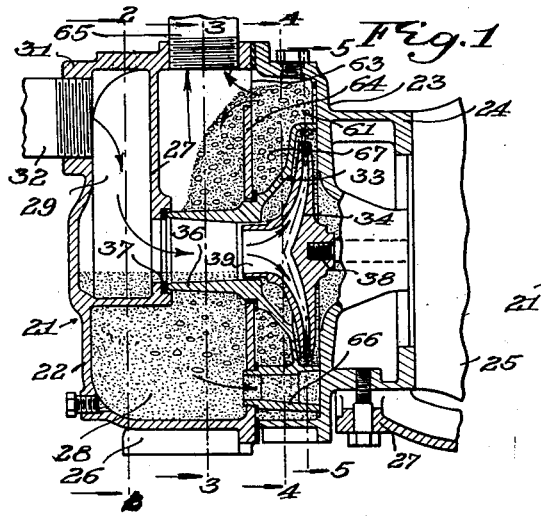
Fig. 1 is a vertical sectional view taken through the pump housing and showing the air separation or settling chamber, the pump casing, impeller and velocity dissipation chamber and illustrating the action which occurs during a portion of the priming cycle.

In the drawings we have shown a typical embodiment of the self-priming pump of our invention as contemplated primarily for fractional horsepower sizes. However, it will be understood that the principles of our invention may be applied to pumps of larger size. In such larger sizes of pumps we may desire to employ a different type of air separation chamber from that described herein which would, of course, change the physical appearance of the pump. By a self-priming pump we mean one which will exhaust air from the suction side of the pump including the suction line or conduit until liquid flows from the source of supply. Referring to Fig. 1 and the diagrammatical illustration in Figs. 7 and 8, the pump of our invention comprises a pump housing generally indicated by the numeral 21 which is divided into a main housing part 22 and a cover part 23 which is formed integral with an adaptor 24 to which a motor or other prime mover 25 may be connected. The housing may be provided with suitable supporting feet 26 and the adaptor and motor provided with an attached support indicated generally by the numeral 27.

The main housing part 22 is cored to provide dividing walls 27 which separate the main housing part into an air separation or settling chamber 28 and a suction inlet or elbow 29 above the level of the impeller eye. A threaded bore 31 enters the main housing part and connects with the suction inlet 29. The threaded bore is adapted to receive the threaded upper end of a suction conduit or pipe 32 which extends into a source of liquid supply as illustrated in Fig. 7.

The cover part 23 encloses an impeller casing 33 which together with the inner wall of the adjacent cover part 23 forms an enclosure about an impeller 34. The impeller casing 33 is provided with an extended cylindrical inlet opening 36 which is sealed with respect to the margins of an opening in the wall 27 as illustrated at 37. The arrangement described provides communication for the flow of water or air from the suction pipe or conduit 32 through the suction inlet 29 to the suction inlet opening of the impeller.

Figure 5:
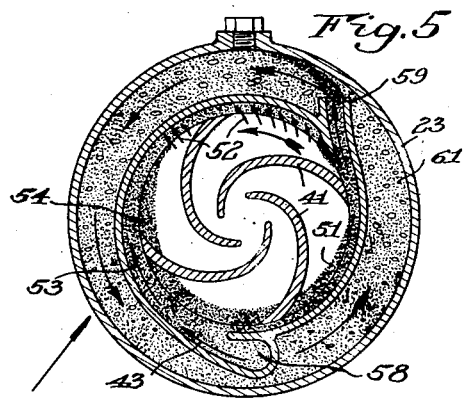
Fig. 5 is a sectional view taken substantially on the line 5—5 of Fig. 1 in the direction indicated by the arrows and indicating the action which occurs during priming with the pump operating at relatively low vacuums.
Figure 12:
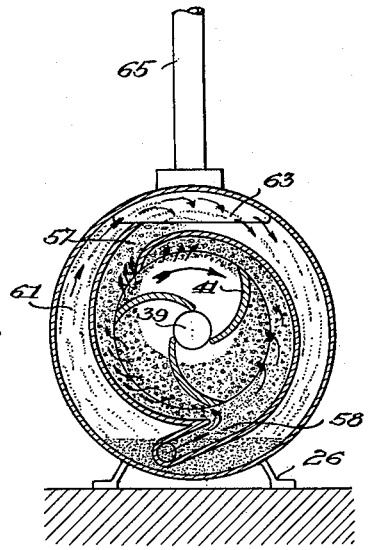
Fig. 12 is a sectional view taken only approximately on the line 12—12 of Fig. 11 in the direction indicated by the arrows but with part of the section taken through the air separation chamber to indicate the water level therein and with water in the velocity dissipation chamber indicated only partly for the same purpose.

The impeller 34 may be connected to the motor shaft, as indicated at 38, and in the construction illustrated in the drawings the impeller is of the enclosed type. However, it will be understood that the invention is equally applicable for use with an open type pump impeller. The impeller includes a suction inlet or eye 39 and a plurality of blades or vanes 41 (Fig. 5). As shown in Fig. 5 the impeller is provided with four vanes but this is, of course, optional. The impeller may be provided with any desired number of vanes or blades. In Figs. 8, 10 and 12, we have illustrated diagrammatically an impeller with three vanes or blades.

As previously mentioned in the pump of the above mentioned co-pending application, two volutes are shown which have cutwaters or cutoffs unequally spaced from the periphery of the impeller. Similarly in the instant invention a pair of volutes 42 and 43 are provided (see Fig. 14). Similarly also in the instant invention two cutoffs or cutwaters 44 and 45 are provided.

While the invention may be applied to a vertical pump, we have shown for purposes of illustration a pump in which the axis of rotation is horizontal. With a horizontal pump, as shown, the more widely spaced cutwater 45 should be toward the bottom of the casing while the more closely spaced cutwater should be adjacent the top. By a closely spaced cutwater we mean one in which a space of approximately 1/64 of an inch more or less is provided between the cutwater and the periphery of the impeller. The cutwater may almost touch the periphery of the impeller and might be considered to form substantially a running fit with it in some sizes of pumps. Whatever the closely spaced cutwater may be, the more widely spaced cutwater 45 is spaced from the periphery of the impeller to a substantially greater extent than the cutwater 44 but the relative spacing will depend upon the size of the pump and the particular design of the volutes.

While we have shown a pump having two volutes and two cutwaters, it might be possible to employ three volutes and three cutwaters, but in that event preferably two of the volutes would open toward the bottom of the pump casing and both would preferably be widely spaced from the impeller. The third cutwater would be closely spaced with respect to the periphery of the impeller as shown in Fig. 14.

The pump thus far described and made in accordance with the above mentioned application even of the enclosed impeller type with one close and one wide cutwater is self-priming with the discharge ends of both volutes fully submerged. It will exhaust a suction line to the vapor tension of the liquid being pumped or until priming has been completed, assuming the suction lift is less than that corresponding to the vapor tension of the liquid being pumped. However, as previously mentioned such a pump may be erratic in its operation, the flow tending to flutter at the cutwaters and occasionally water is taken in at the closely spaced cutwater instead of at the more widely spaced cutwater. Because of this tendency to reverse both volute discharges must be positively submerged with the liquid and the necessity of meeting this condition requires the use of foot valves, check valves or auxiliary syphon breakers which will break the syphoning action without draining the liquid from the pump to a level such as to expose either volute discharge to air when the pump stops. During the entire priming cycle both volute discharges should be positively submerged with liquid.

We have discovered that by properly proportioning, shaping, arranging and locating the two volutes and their associated cutwaters, the above described objectionable features can be eliminated. When properly designed, during the priming cycle mixed liquid and air will continuously discharge through one of the volutes past the close cutwater, and liquid will continuously be drawn in through the other volute past the more widely spaced cutwater so that the action is positive and priming at very high suction lifts up to the vapor tension of the liquid being pumped is possible.

Referring now to Figs. 14 and 15, the two volutes 42 and 43 shown are arranged so that the discharge volute 42 extends from adjacent the bottom of the pump from the more widely spaced cutwater 45 in the direction of rotation of the impeller. This volute discharge is adjacent the top of the pump. The other or intake volute 43 extends from the closely spaced cutwater 44 in the direction of rotation of the impeller and opens toward the bottom of the pump. In the particular arrangement shown in the drawings, the discharge volute encompasses about 3/8 of the circumference of the impeller while the intake volute encompasses about 5/8 of the impeller. This arrangement has been found satisfactory for both open and closed impellers. However, pumps with volutes proportioned relative to the total circumference of the impeller of 1/2 and 1/2 and 1/4 and 3/4 have been successfully operated and the following description applies also to such volute arrangements.

We have found that the positive action above described can be obtained when the radial dimensions A, B, C, D and E (Fig. 14) are less than the corresponding radial dimensions A', B', C', D' and E', the axial width W (Fig. 15) being the same for both volutes. This structure results in an unbalancing of the volutes with the intake volute 43 having greater volumetric capacity than the discharge volute 42. When the volutes and their associated cutwaters are thus proportioned, shaped and arranged, during the priming cycle, liquid is continuously taken in through the intake volute 43 from the air separation chamber, air is drawn into the impeller from the suction side of the pump, mixed with the water in the intake volute and the mixture of air and water continuously discharged through the discharge volute 42.

The efficiency of the pump of our invention in exhausting air or gas from the suction line during the priming cycle depends to a large extent on the rate of divergence of the discharge volute 42.

Figure 13:
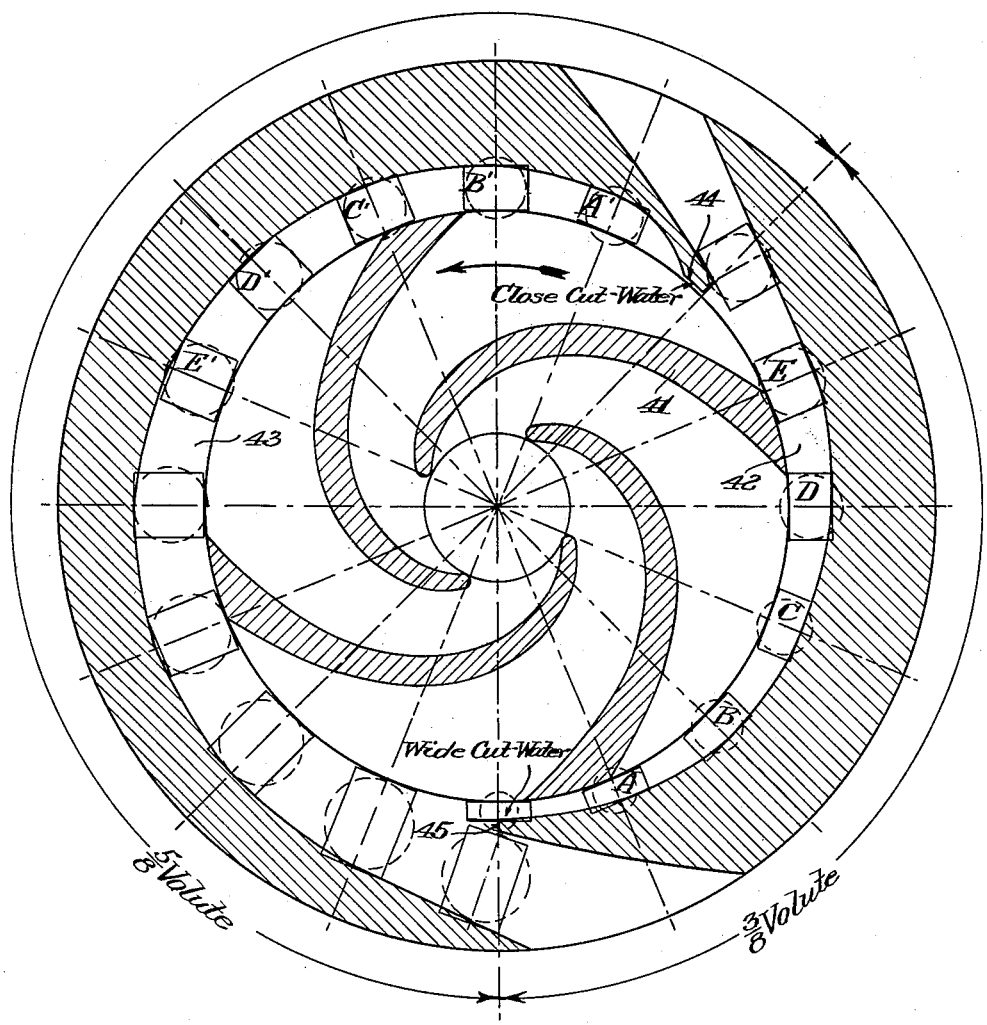
Fig. 13 is a diagrammatic view illustrating how the volutes are developed.

In the drawings, particularly in Fig. 13, we have shown a discharge volute in which the rate of divergence is equivalent to that of a 1° 40' cone wrapped around the impeller. This is a good average value for both air and water pumping efficiency. With the discharge volute thus proportioned to provide for maximum air pumping efficiency, the intake volute is then proportioned so that beginning with the posterior side of the close cutwater 44, the volumetric capacity, particularly at the points A' and B' but preferably throughout the extent of the volute, is of greater volumetric capacity than the corresponding points A, B, C, D and E of the discharge volute. The more critical point appears to be at or near A' and B' which should be larger in volumetric capacity than the corresponding points A and B, as air, when the pump is observed under test, appears to be drawn into the intake volute from the impeller particularly at the points A' and B' and at low vacuums also adjacent the point C'.

Any given pump impeller when primed and pumping liquid rotating at a given speed will discharge a substantially fixed quantity of liquid, assuming constant conditions as to suction lift and discharge head. With the quantity of water discharged known for assumed conditions of suction lift and discharge head, there is a range of areas of discharge volutes at the cutwaters 44 and 45 required to enable the water to be discharged from the pump impeller in an efficient manner. The precise ratio of the total volute area at the cutwaters with respect to the capacity of the impeller is not fixed to any definite ratio but the proper discharge area for meeting given conditions is known to and can be selected by any qualified centrifugal pump designer. With the total discharge area of the volutes at the cutwaters selected in accordance with good pump design, we apportion this area between the two volutes preferably in the same ratio as the circumferential proportioning of the two volutes employed. Thus, as shown in the drawings, the discharge volute encompasses ⅜ of the total circumference of the impeller while the intake volute encompasses ⅝ of the circumference of the impeller and the area of the discharge volute at the cutwater 44 should preferably be approximately relative to the discharge area at the wide cutwater 45 as 3 is to 5. We have found this apportioning of the total volute area to be satisfactory for both open and closed impeller pumps and it is satisfactory for securing fast priming on high suction lifts.

In Fig. 13 we have illustrated how the volutes are laid out in the particular illustration shown and have indicated by circles that the volutes at any particular point are equal in cross-sectional area at corresponding planes to corresponding planes through a cone. In laying out the volutes with the cross-sectional area of the discharge volute at the cutwater 44 selected, as stated above, the volute progressively decreased in cross-sectional area to the cutwater 45 in accordance with the decrease in cross-sectional area of a right circular cone the angle of divergence of each is 1°40'. This is the angle of divergence shown in the illustrative representation of our invention, but as previously mentioned this equivalent cone angle may be varied within reasonable limits. Similarly, the intake volute is laid out from the cutwater 45 with the volute decreasing in cross-sectional area in accordance with the decrease in cross-sectional area of a right circular cone having an angle of divergence of 1°40'.

The last few degrees of this intake volute are distorted somewhat to form the close cutwater 44. While we have described each of the volutes as having a rate of increase in cross-sectional area equivalent to that of a cone having an angle of divergence of 1°40', it would be possible to employ two volutes in which the rate of change in cross-sectional area is different providing the rate of change in cross-sectional area of the intake volute is such that the cross-sectional area at the points A', B', C', D' and E' is greater than at the points A, B, C, D and E. Moreover, the rate of divergence of 1°40' or any other rate selected need not be maintained nor need it be constant throughout the volute so long as the condition is met that the cross-sectional areas of the corresponding points, previously mentioned, of the intake volute particularly at the points A' and B' shall be greater than the cross-sectional area of the corresponding points of the discharge volute.

In carrying on experiments with respect to our invention, a transparent pump was built for visual observation. This pump had an open impeller and the flow both in the volutes and in the impeller during the priming cycle could be noted. From visual observation the appearance of the priming action of the particular pump observed at low vacuums is illustrated approximately in Fig. 5 with the liquid rotating, as indicated at 51, in a ring slightly eccentric with respect to the axis of the impeller. But the liquid ring at these low vacuums lies close to the periphery of the impeller. This condition exists because there is very little pressure differential between the suction and discharge sides of the impeller. Adjacent the points A', B' and C' as indicated by the arrows 52 the eccentric liquid ring breaks clear of the outer diameter of the impeller and air is drawn into the intake volute from the impeller in this sector.

As previously mentioned, during the priming cycle, water from the priming chamber is continuously drawn into the intake volute 43 past the wide cutwater and flows somewhat, as indicated by the arrows 53, so that a frothy mixture of air and liquid is formed in the intake volute and this frothy mixture partially extends into the impeller as indicated at 54.

Figure 6:
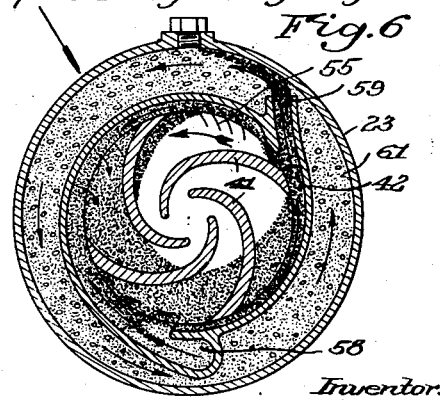
Fig. 6 is a view similar to Fig. 5 indicating the action which occurs when the pump is operating at relatively high vacuums.

At high vacuums, the action is illustrated in Fig. 6. As shown in this view, the ring of liquid is well inside the impeller for most of its circumference and its eccentricity to the impeller increases with increasing vacuums. The increased depth of the ring with respect to the periphery of the impeller indicates the greater vacuum the impeller is maintaining against atmospheric discharge. However, it will be again noted that adjacent the points A', B' and C', although over a somewhat smaller area, the liquid ring breaks clear of the outer diameter of the impeller as indicated by the arrows 55, so that air is drawn into the intake volute from the impeller. The eccentric position of the liquid ring described with reference to Figs. 5 and 6 is caused by the particular design of the volutes previously mentioned.

Figure 4:
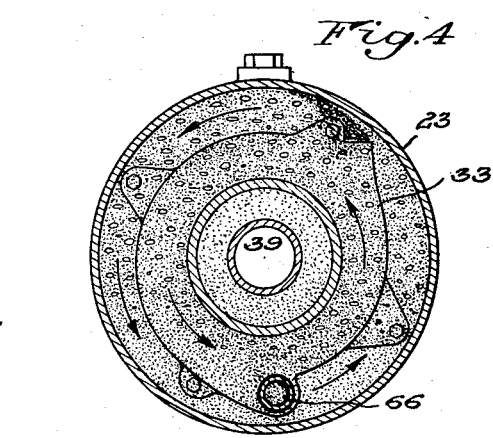
Fig. 4 is a sectional view taken substantially on the line 4—4 of Fig. 1 in the direction indicated by the arrows.

The intake and discharge volutes merge respectively into intake and discharge ports 58 and 59. The velocity of the mixture of air and liquid through the discharge port 59 is relatively high, particularly as the vacuum increases. The discharge is directed in a somewhat tangential direction with respect to the adjacent wall of the cover as illustrated in Fig. 5. The discharge is directed into what may be termed a "velocity dissipation chamber" 61. By reason of imparting a directional flow to the mixture of water and air and the confining action of the wall forming the velocity dissipation chamber the water and air are given a circular motion around the velocity dissipation chamber. By thus directing the mixture in a rotary direction around the dissipation chamber as indicated by the arrows in Fig. 4, a motion of water and air is set up around the exterior of the impeller casing and there is a tendency for the velocity thereof to be dissipated prior to passage of the air and water through an elongated opening 63 formed in a sealed wall 64 which separates the velocity dissipation chamber 61 from the air separation chamber 28. Thus the velocity of the air and water is reduced prior to passage into the air separation chamber which greatly reduces the turbulence in the air separation chamber 28.

Figure 2:
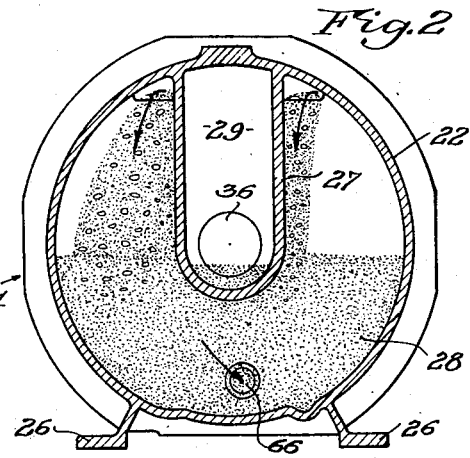
Fig. 2 is a sectional view taken on the line 2—2 of Fig. 1 in the direction indicated by the arrows.
Figure 3:
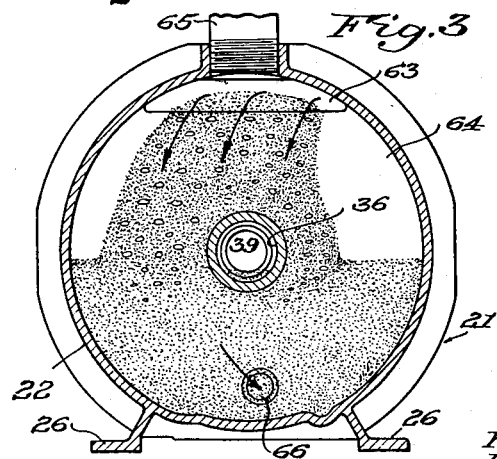
Fig. 3 is a sectional view taken substantially on the line 3—3 of Fig. 1 in the direction indicated by the arrows.

In Figs. 2 and 3, we have indicated by arrows the flow of water over the wall 64 during the initial portion of the priming cycle and indicated the water settling out and the air tending to rise toward the discharge pipe 65.

The intake port 58 connects with a passage 66 which communicates through an opening in the wall 64 with the bottom of the air separation chamber or settling chamber 28. Thus during priming, water from which a large part of the air has been extracted is drawn through the passage 66 through the port 58 into the intake volute 43. This water, together with the air withdrawn from the suction pipe through the impeller is discharged through the discharge volute 42 and discharge port 59 into the velocity dissipation chamber. The mixture of water and air flows over the wall, the air passing to the discharge outlet and the water being continuously recirculated through the above described circuit until the priming cycle has been completed. It will be particularly noted that the portion 67 of the velocity dissipation chamber lying below the discharge outlet 59 forms a closed container and the water therein will stand at the level of the discharge port 59 regardless of the level of the water retained in the air separation chamber when the pump is stopped and the discharge and suction pipes are vented through the pump.

While the pump of our invention has been designed particularly with a view of eliminating obstructions of any kind such as valves in the suction and discharge lines, it is, of course, possible to employ a valve if it is desired to maintain the system always completely flooded. However, when no valve is employed a passage is provided from the point of disposal or use of the liquid back to the source of supply which is free and uninterrupted except for the rotatable impeller. When the impeller stops, this through passage is open so water may drop from the discharge pipe back through the pump and suction pipe to the source of supply until the system vents through the eye of the impeller as indicated in Fig. 7. Fig. 7 indicates the approximate maximum height at which the liquid level may lie and still permit the pump to vent through the eye of the impeller and break the syphon action. Under these conditions it will be noted, the discharge volute and part of the impeller are exposed to air. However, the level indicated in Figs. 7 and 8 is not the minimum level of liquid at which the pump will reprime when started again.

From the level shown in Figs. 7 and 8, the water level may vary down to the level indicated in Figs. 9 and 10. The level indicated in Figs. 9 and 10 is the minimum required to cover the lower part of the impeller and enable the priming action to be initiated. The priming action can not start unless the lower tips of the vanes of the impeller are sufficiently covered with water.

Figure 11:
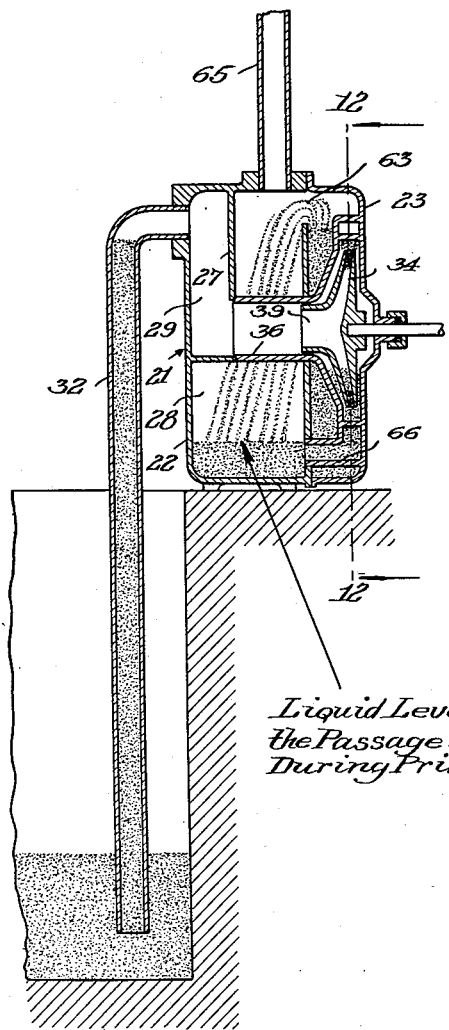
Fig. 11 is a diagrammatic sectional view showing the action during the priming cycle and indicating the minimum liquid level which must exist at all times during the priming cycle in order to positively seal the passage to the intake volute of the pump.

In Figs. 11 and 12 we have indicated a condition under which the pump is operating and air has been exhausted from the suction line until water is almost entering the pump casing as indicated by the level of the water in the suction pipe 32. Under these conditions the maximum amount of water is being recirculated in the volutes to carry on the priming action and the water in the air separation chamber is at its lowest level. The water level indicated in the air separating chamber should not under these conditions drop below the plane indicated so as to expose the inlet passage 66 to air. In operating the pump the volume of the priming charge must be sufficient so that the water level will not drop below the level indicated in Fig. 11 since, if the intake volute draws air, the priming action will be impeded or halted.

It will be understood from what has been stated concerning the physical construction of the pump of our invention that the volumetric capacity of the intake volute is considerably greater than that of the discharge volute. This is important for two reasons, which are coupled together or in a sense complementary to each other. First, since the volumetric capacity of the intake volute 43 is relatively large, during priming the velocity of the liquid or mixture of liquid and air thrown outward into this passage by the impeller is quickly reduced to the end that the velocity of flow in the intake volute 43 in a counterclockwise direction is relatively sluggish. This relatively low velocity permits inflow of liquid through the intake port 58 into the intake volute 43 in sufficient volume for efficient priming. Second, this relatively large flow of liquid inward to the intake volute, coupled with the fact that the discharge volute 42 is maintained relatively small in volumetric capacity maintains the velocity of flow of liquid or mixture of liquid and air in the discharge volute 42 at a relatively high value. The flow of liquid in the discharge volute is in sufficient volume and is at sufficient velocity by reason of the unbalancing of the volutes in the manner described to maintain the discharge volute at the cutwater or cut-off 44 sealed against the entry of air through the discharge port 59.

The desirability of having the intake volute larger in cross-sectional area, particularly at the points A' and B' as compared to the corresponding points A and B of the discharge volute appears most important in securing more rapid priming, particularly when starting the pump with the system at atmospheric pressure; in securing efficient priming to reduce the time of the priming cycle; and in insuring that priming will occur and the desired positive priming action secured when the pumps are built on a production basis with reasonable tolerances and considering the many variables inherent in a centrifugal pump. Moreover, the performance of the pump is improved if the cross-sectional areas of the volutes decrease from the cut-offs at a uniform rate and if the portions of the castings which form the volute channels are smooth. In most cases the velocity dissipation chamber or some equivalent means of maintaining the discharge volute flooded at all times during priming is important in insuring that air does not enter the pump casing through the discharge volute.

While we have described the preferred method of priming a centrifugal pump, and have described the preferred structure thereof, various changes and modifications may be made particularly in the form and relation of parts without departing from the spirit of our invention as set forth in the appended claims.

We claim:

1. A self-priming centrifugal pump comprising, in combination, an impeller casing, an impeller mounted in said casing with its axis of rotation horizontal, a suction inlet through which liquid from the source of supply flows to said impeller, an air separation chamber having a discharge pipe for liquid connected to the point of use, said casing having at least two connections to said air separation chamber with one of said connections being substantially at the top of said casing and another toward the bottom thereof, a cutoff adjacent each of said connections, the upper cutoff forming substantially a running fit with the impeller and the lower cutoff being relatively widely spaced from the impeller, a discharge passage extending from the lower cut off and increasing in cross-sectional area in the direction of rotation of the impeller toward the upper cutoff, an intake passage extending from the upper cutoff and increasing in cross-sectional area toward the lower cutoff, said intake passage being of greater cross-sectional area throughout most of its length than the discharge passage, said pump having a flow passage from the source of supply to the point of use which is free of valves or obstructions of any kind except for the impeller, the liquid when the pump is stopped after a period of use being free to drop from the discharge pipe through the casing back to the source of supply until air breaks through the suction inlet to break the syphon action, said air separating chamber being so constructed and arranged with respect to the impeller and its casing that liquid is trapped in the air separation chamber and casing in a volume sufficient to cover the bottom connection and the lower portions of the blades of the impeller but the upper portions of the blades of the impeller and the upper connection being exposed to air, said impeller when started and at all times during the priming cycle drawing water from the air separation chamber through the lower connection into the intake passage and drawing air through said suction inlet into said intake passage, the water and air being discharged through said discharge passage with the water sealing said upper connection, said intake passage becoming a discharge passage for liquid when the priming cycle has been completed.

2. A self-priming pump in accordance with claim 1 in which the air separating chamber is substantially in the same general horizontal plane as the impeller and the suction inlet rises well above the axis of the impeller.

3. A self-priming centrifugal pump in accordance with claim 1 in which the radial depth of the intake passage is greater at all corresponding successive radial planes than the discharge passage, the corresponding successive radial planes being taken from the cutoffs in the direction of rotation of the impeller.

4. A self-priming pump in accordance with claim 1 in which the upper connection includes a velocity dissipation chamber between the discharge passage and the air separation chamber.

5. A self-priming pump in accordance with claim 1 in which the increase in cross-sectional area of said discharge passage corresponds approximately to that of a right circular cone whose angle of divergence is one degree forty minutes.

6. A self-priming centrifugal pump comprising, in combination, an impeller casing, an impeller mounted in said casing, a pair of cutwaters in said casing, said cutwaters being unequally spaced from the periphery of the impeller, a discharge passage formed in said pump casing extending from the more widely spaced cutwater and increasing in cross-sectional area in the direction of rotation of the impeller toward the other cutwater, a casing discharge through which said passage discharges, a second passage extending from said other cutwater and increasing in cross-sectional area in the direction of rotation of the impeller toward the more widely spaced cutwater, a port with which said second passage terminates, said second passage on the posterior side of said other cutwater and adjacent said other cutwater being greater in cross-sectional area than the corresponding point on the posterior side of the more widely spaced cutwater and said second passage being at corresponding successive radial planes through said passages greater in cross-sectional area than said discharge passage.

7. A self-priming centrifugal pump comprising, in combination, an impeller casing, an impeller mounted in said casing with its plane of rotation vertical, a pair of cutwaters, said cutwaters being unequally spaced from the periphery of the impeller, a discharge passage formed in said pump casing extending from the more widely spaced cutwater and increasing in cross-sectional area in the direction of rotation of the impeller toward the other cutwater and terminating in a discharge located adjacent the top of the casing, a second passage extending from said other cutwater and increasing in cross-sectional area in the direction of rotation of the impeller toward the more widely spaced cutwater and terminating in a port located toward the bottom of the casing from said discharge, said second passage being at corresponding successive radial planes through said passages greater in cross-sectional area than said discharge passage, and an air separation chamber with which said discharge and port communicate.

8. A self-priming centrifugal pump comprising, in combination, an impeller casing, an impeller mounted in said casing with its plane of rotation vertical, a pair of cutwaters, said cutwaters being unequally spaced from the periphery of the impeller, a discharge passage formed in said pump casing extending from the more widely spaced cutwater and increasing in cross-sectional area in the direction of the rotation of the impeller toward the other cutwater and terminating in a discharge located adjacent the top of the casing, a second passage extending from said other cutwater and increasing in cross-sectional area in the direction of the rotation of the impeller toward the more widely spaced cutwater and terminating in a port located toward the bottom of the casing from said discharge, said second passage on the posterior side of said other cutwater and adjacent said other cutwater being greater in cross-sectional area than the corresponding point on the posterior side of the more widely spaced cutwater and said second passage being at corresponding successive radial planes through said passages greater in cross-sectional area than said discharge passage, and an air separation chamber with which said discharge and port communicate, said air separating chamber being mounted sidewardly of the impeller casing with a major portion of its volume on the same general level as the impeller.

9. A self-priming centrifugal pump comprising, in combination, an impeller casing having a suction pipe connected to a source of liquid supply, an impeller mounted in said casing with its plane of rotation vertical, a discharge volute formed in said casing having a wall lying in the plane of rotation of the impeller and extending from adjacent the lower part of the casing at which part said wall is relatively widely spaced from the periphery of the impeller, said volute extending in the direction of rotation of the impeller toward the top of the casing, a discharge port adjacent the top of the casing with which said volute merges, a cutoff substantially at the point of merger of said discharge volute with said discharge port, said cutoff being relatively closely spaced with relation to the periphery of the impeller, a second volute extending from said cutoff in the direction of rotation of the impeller toward the bottom of the casing, a combined intake and discharge port with which said second volute merges, and an air separation chamber with which said ports communicate, said volutes being constructed and arranged in a manner such that the volumetric capacity of said second volute is greater than the volumetric capacity of said first volute, the greater capacity of said second volute cooperating with said closely spaced cutwater to create a subatmospheric pressure on the posterior side of said cutwater into which air is drawn when the pump is operating and air exists in the suction pipe, said combined intake and discharge port serving during the priming cycle as a flow entrance for liquid from the air separating chamber to said impeller, said liquid mixing with the air and being discharged with the air through said discharge port, said discharge port at all times serving as a discharge for liquid or a mixture of liquid and air, and said combined suction and discharge port serving at all times during the priming cycle as an entrance for liquid and after the priming cycle has been completed as a discharge port for liquid from the impeller.

10. A self-priming centrifugal pump comprising, in combination, an impeller casing having a suction pipe connected to a source of liquid supply, an impeller mounted in said casing with its plane of rotation vertical, a discharge volute formed in said casing having a wall lying in the plane of rotation of the impeller and extending from adjacent the lower part of the casing at which part said wall is relatively widely spaced from the periphery of the impeller, said volute extending in the direction of rotation of the impeller toward the top of the casing, a discharge port adjacent the top of the casing with which said volute merges, a cutoff substantially at the point of merger of said discharge volute with said discharge port, said cutoff forming substantially a running fit with relation to the periphery of the impeller, a second volute extending from said cutoff in the direction of rotation of the impeller toward the bottom of the casing, a combined intake and discharge port with which said second volute merges, and an air separation chamber with which said ports communicate, said air separation chamber being mounted sidewardly of the impeller casing with a major portion of its volume on the same general level as the impeller, said volutes being constructed and arranged in a manner such that the volumetric capacity of said second volute is greater than the volumetric capacity of the first volute, the greater capacity of said second volute cooperating with said closely spaced cutwater to create a subatmospheric pressure on the posterior side of said cutwater into which air is drawn when the pump is operating and air exists in the suction pipe, said combined intake and discharge port serving during the priming cycle as a flow entrance for liquid from the air separating chamber to said impeller, said liquid mixing with the air at least in part in said second volute and being discharged with the air through said discharge port, said discharge port at all times serving as a discharge for liquid or a mixture of liquid and air, and said combined intake and discharge port serving at all times during the priming cycle as an entrance for liquid and after the priming cycle has been completed as a discharge port for liquid from the impeller.

11. A self-priming centrifugal pump comprising, in combination, an impeller casing, a suction pipe connected to a source of liquid supply and a discharge pipe connected to a point of disposal of the liquid, an impeller mounted in said casing with its plane of rotation vertical, a discharge volute formed in said casing having a wall lying in the plane of rotation of the impeller and extending from adjacent the lower part of the casing at which part said wall is relatively widely spaced from the periphery of the impeller, said volute etxending in the direction of rotation of the impeller toward the top of the casing, a discharge port adjacent the top of the casing with which said volute merges, a cutoff substantially at the point of merger of said discharge volute with said discharge port, said cutoff being relatively closely spaced with relation to the periphery of the impeller, a second volute extending from said cutoff in the direction of rotation of the impeller toward the bottom of the casing, a combined intake and discharge port with which said second volute merges, and an air separation chamber with which said ports communicate, said air separation chamber being mounted sidewardly of the impeller casing with a major portion of its volume on the same general level as the impeller, said volute being constructed and arranged in a manner such that the volumetric capacity of said second volute is greater than the volumetric capacity of said first volute, the greater capacity of said second volute cooperating with said closely spaced cutwater to create a subatmospheric pressure on the posterior side of said cutwater into which air is drawn when the pump is operating and air exists in the suction pipe, said combined intake and discharge port serving during the priming cycle as a flow entrance for liquid from the air separating chamber to said impeller, said liquid mixing with the air and being discharged with the air from said discharge port, said discharge port at all times serving as a discharge for liquid or a mixture of liquid and air, said combined intake and discharge port serving at all times during the priming cycle as an entrance for liquid and after the priming cycle has been completed as a discharge port for liquid from the impeller, and said pump and the suction and discharge pipes being devoid of mechanical obstruction and except for the impeller a through open passage exists from the source of liquid supply to the point of disposal of the liquid whereby the pump drops to atmospheric pressure when stopped and starts with the discharge of liquid through said discharge port being against atmospheric pressure.

12. A self-priming centrifugal pump comprising, in combination, an impeller casing having at least two volute passages, discharge openings at the ends of said volute passages, an impeller mounted in said casing with its axis of rotation horizontal, an air separation chamber with which said discharge openings connect, and means including a velocity energy dissipation chamber between at least one of the discharge openings which opens toward the top of the impeller casing but not all of the discharge openings and the air separation chamber through which the liquid flows prior to passage to said air separation chamber for reducing the velocity energy of the liquid prior to passage of the liquid to the air separation chamber, said velocity energy dissipation chamber being in the form of a vessel open at the top to the air separation chamber and closed at the bottom and sides to thereby retain a charge of liquid when the pump is stopped.

13. A self-priming pump comprising, in combination, an impeller casing having a suction line, an air separation chamber, an impeller mounted in said casing having an orbit of rotation, a pair of connections between said impeller casing and said air separation chamber, a pair of flow passages formed in said casing outwardly of the impeller orbit, a cutwater with which each of said flow passages terminates, said cutwaters being unequally spaced from the impeller orbit and said flow passages being of different cross-sectional areas, the flow passage of lesser cross-sectional area extending from the more widely spaced cutwater around the orbit of the impeller in the direction of rotation of the impeller and terminating adjacent the more closely spaced cutwater where it merges with one of said connections, said flow passage always serving as a discharge for liquid and air withdrawn from the suction line, the flow passage of greater cross-sectional area extending from the more closely spaced cutwater around the orbit of the impeller in the direction of rotation of the impeller and terminating adjacent the more widely spaced cutwater where it merges with the other of said connections, said flow passage always serving during the priming cycle as an intake passage for liquid recirculated from the air separation chamber from which a major part of the air has been removed, the flow in said latter passage reversing when the priming cycle has been completed.

14. A self-priming pump in accordance with claim 13 in which the flow passages are volutes and in which the increase in cross-sectional area from the cutwaters from which they extend is substantially constant throughout substantially their entire length.

15. A self-priming pump in accordance with claim 13 in which the ratio of the cross-sectional areas and hence volumetric capacities of the two flow passages is such that during priming a sufficient quantity of liquid is recirculated from the air separation chamber so that its discharge by the impeller fills the discharge flow passage with liquid, carrying air in suspension withdrawn from the suction line, flowing at high velocity with the velocity increasing with increasing subatmospheric pressures.

16. A self-priming pump in accordance with claim 13 in which the flow passages are volutes and in which the increase in cross-sectional area from the cut-waters from which they extend is substantially constant throughout substantially their entire length and in which the ratio of the cross-sectional areas and hence volumetric capacities of the two volutes is such that during priming a sufficient quantity of liquid is recirculated from the air separation chamber so that its discharge by the impeller fills the discharge volute with liquid, carrying air in suspension withdrawn from the suction line, the liquid flowing through the discharge volute at high velocity with the velocity increasing with increasing subatmospheric pressures.

17. A self-priming pump in accordance with claim 13 in which means are provided beyond but adjacent the discharge flow passage to form a liquid seal to minimize inflow of air through said discharge flow passage into the casing during the priming cycle.

18. A self-priming pump in accordance with claim 13 in which the flow passages are volutes and in which the increase in cross-sectional area from the cutwaters from which they extend is substantially constant throughout substantially their entire length and in which the ratio of the cross-sectional areas and hence volumetric capacities of the two volutes is such that during priming a sufficient quantity of liquid is recirculated from the air separation chamber so that its discharge by the impeller fills the discharge volute with liquid, carrying air in suspension withdrawn from the suction line, the liquid flowing through the discharge volute at high velocity with the velocity increasing with increasing subatmospheric pressures, means beyond but adjacent the discharge volute to form a liquid seal to minimize inflow of air through said discharge volute into the casing during the priming cycle, the impeller casing having a suction inlet and a downwardly extending passage between the suction inlet and the suction line and the impeller being mounted with its axis of rotation horizontal, said suction line and downwardly extending passage being devoid of any valve and said impeller casing and air separation chamber being mounted in side by side relation and being so constructed and arranged that liquid may siphon out of the casing and the air separation chamber until air brakes through the suction inlet, there being sufficient reserve liquid in the casing and air separation chamber when this occurs that the lower end of the impeller is submerged to enable the pump to start without repriming.

19. A self-priming pump comprising, in combination, an impeller casing having a suction inlet, a suction line, a downwardly extending passage between the suction line and said suction inlet, an air separation chamber, an impeller mounted in said casing having an orbit of rotation, a pair of connections between said casing and said air separation chamber, a pair of flow passages formed in said casing outwardly of the impeller orbit, a cutwater with which each of said flow passages begins, said flow passages being of unequal cross-sectional areas at substantially all successive radial planes starting at the cutwaters and each of said flow passages merging into one of said connections, the flow passage of lesser cross-sectional area terminating adjacent the top of the casing and always serving as a discharge and the flow passage of greater cross-sectional area terminating adjacent the bottom of the casing and always serving during the priming cycle as an intake passage for liquid recirculated from the air separation chamber from which a major part of the air has been removed, the flow in said latter passage reversing when the priming cycle has been completed, said flow passages being volutes which increase in cross-sectional area in the direction of rotation of the impeller from the cutwaters from which they begin by substantially constant increments throughout substantially their entire length, the ratio of the cross-sectional areas and hence the volumetric capacities of the two volutes being such that during the priming cycle a sufficient quantity of liquid is recirculated from the air separation chamber so that its discharge by the impeller fills the discharge flow passage with liquid, carrying air in suspension withdrawn from the suction line, flowing at high velocity with the velocity increasing with increasing subatmospheric pressures.

20. A self-priming pump in accordance with claim 19 in which the plane of rotation of the impeller is vertical and means are provided adjacent the discharge connection to form a liquid seal to minimize inflow of air through said connection into the casing during the priming cycle, said suction line and downwardly extending passage being devoid of any valve and said impeller casing and air separation chamber being mounted in side by side relation and being so constructed and arranged that liquid may siphon out of the casing and the air separation chamber until air breaks through the suction inlet, there being sufficient reserve liquid in the casing and air separation chamber when this occurs that the lower end of the impeller is submerged to enable the pump to start without repriming.

21. A self-priming pump comprising, in combination, an impeller casing having a suction inlet, a suction line, a downwardly extending passage between the suction line and said suction inlet, an air separation chamber, an impeller mounted in said casing having an orbit of rotation, a pair of connections between said casing and said air separation chamber, a pair of flow passages formed in said casing outwardly of the impeller orbit, a cutwater with which each of said flow passages begins, said cutwaters being unequally spaced from the impeller orbit, one of said flow passages starting at the more widely spaced cutwater extending in the direction of rotation of the impeller and merging into one of said connections at the more closely spaced cutwater and the other of said flow passages starting at the more closely spaced cutwater extending in the direction of rotation of the impeller and merging into the other of said connections at the more widely spaced cutwater, the former of said flow passages always serving as a discharge and the latter serving as an intake during the priming cycle for liquid recirculated from the air separation chamber from which a major part of the air has been removed, the circulation in said latter flow passage reversing after the priming cycle has been completed, said flow passages being volutes which increase in cross-sectional area from the cutwaters from which they start by substantially constant increments throughout substantially their entire length, the connection with which the volute which starts at the more widely spaced cutwater merges having a liquid seal to minimize inflow of air through said connection into the casing during the priming cycle.

22. A self-priming pump in accordance with claim 21 in which the plane of rotation of the impeller is vertical and in which the volute which starts at the more widely spaced cutwater extends from adjacent the bottom of the casing toward the top thereof, said suction line and downwardly extending passage being devoid of any valve and said impeller casing and air separation chamber being mounted in side by side relation and being so constructed and arranged that liquid may siphon out of the casing and the air separation chamber until air breaks through the suction inlet there being sufficient reserve liquid in the casing and air separation chamber when this occurs that the lower end of the impeller is submerged to enable the pump to start without repriming.

JOHN MANN.
ROMAINE P. SHUSTER.

REFERENCES CITED

The following references are of record in the file of this patent:

UNITED STATES PATENTS

| Number | Name | Date |
|---|---|---|
| 1,908,635 | La Bour | May 9, 1933 |
| 1,993,267 | Ferguson | Mar. 5, 1935 |
| 2,110,883 | La Bour | Mar. 15, 1938 |
| 2,292,529 | La Bour | Aug. 11, 1942 |
| 2,461,925 | Rupp | Feb. 15, 1949 |

FOREIGN PATENTS

| Number | Country | Date |
|---|---|---|
| 472,357 | Great Britain | Sept. 22, 1937 |
| 673,662 | Germany | Mar. 25, 1939 |